(12) United States Patent
Aghadavoodi Jolfaei et al.

(10) Patent No.: US 8,701,117 B2
(45) Date of Patent: Apr. 15, 2014

(54) RESOURCE CONSUMPTION TEMPLATE PROCESSING MODEL

(75) Inventors: Masoud Aghadavoodi Jolfaei, Wiesloch (DE); Edgar Lott, Nussloch (DE)

(73) Assignee: SAP AG, Walldorf (DE)

( * ) Notice: Subject to any disclaimer, the term of this patent is extended or adjusted under 35 U.S.C. 154(b) by 554 days.

(21) Appl. No.: 12/831,155

(22) Filed: Jul. 6, 2010

(65) Prior Publication Data
US 2012/0011515 A1 Jan. 12, 2012

(51) Int. Cl.
*G06F 9/46* (2006.01)

(52) U.S. Cl.
USPC .......................................................... 718/103

(58) Field of Classification Search
None
See application file for complete search history.

(56) References Cited

U.S. PATENT DOCUMENTS

2003/0120710 A1* 6/2003 Pulsipher et al. ............. 709/106
2006/0221823 A1* 10/2006 Shoham et al. ............... 370/229
2009/0138883 A1* 5/2009 McLean ........................ 718/104
2009/0210356 A1* 8/2009 Abrams et al. ................ 705/400
2011/0320606 A1* 12/2011 Madduri et al. .............. 709/226

OTHER PUBLICATIONS

SaaS pricing model, (Jul. 19, 2009) as filed on IDS.*
SaaS, located at http://en.wikipedia.org/wiki/Software_as_a_service Jun. 18, 2010.
Saas Pricing Model, located at http://saasfans.com/2007/07/saas-pricing-model/ Jul. 19, 2009.
Lana Gates, "Saas Pricing Gaining," IT Infrastructure. Mar. 2007.
Javier Gimenez "About SaaS Pricing Models", Sep. 2008.

* cited by examiner

*Primary Examiner* — Emerson Puente
*Assistant Examiner* — Sisley Kim
(74) *Attorney, Agent, or Firm* — Fountainhead Law Group PC (57) ABSTRACT

In one embodiment, a method determines a task to execute in a computer processing system. A resource consumption template from a plurality of resource consumption templates is determined for the task. The plurality of resource consumption templates have different priorities. A computer processing system determines resources for the task based on the determined resource consumption template. Also, the computer processing system processes the task using the allocated resources. The processing of the task is prioritized based on the priority of the resource consumption template.

18 Claims, 7 Drawing Sheets

RESOURCE CONSUMPTION TEMPLATE PROCESSING MODEL

BACKGROUND

Particular embodiments generally relate to data processing and more specifically to resource consumption template processing.

Software-as-a-service (SaaS) is software that is deployed over the Internet or in a distributed model. One reason software-as-a-service applications are offered is the flexibility in pricing. Because SaaS customers lease the applications they use from vendors as opposed to buying the applications, vendors can offer different pricing models. Some different models include flat fees, usage-based fees, feature-based fees, and offering the software for free.

The flat fee may be a monthly flat fee that is charged. The flat fee may be adjusted up and down based on the number of users.

A usage-based fee may be charged based on usage criteria. For example, the vendor could track each record that is created within a system by a customer and then bill the customer based on the total records created that month.

A feature-based fee may be an "a la carte" system of adding and removing features/modules. The vendors may assign a cost value to each feature/module and then charge the customer a total amount for the features/modules that are added by the customer.

Also, the free model may offer the software for free. However, vendors may make money through other methods, such as advertising.

Vendors offer each of the pricing models as an on-demand service. Also, each pricing model may be categorized into a different package that contains a set of functionalities, such as a certain amount of database space, memory, e-mail accounts, service level agreements, etc. Different sizes of the packages may be offered where the amount of functionalities varies among the packages. For example, bigger packages may provide access to more resources or features.

Application server engines are used to execute the applications. These application server engines are not tailored to execute the applications based on the underlying pricing model. For example, application servers allocate resources based on the task received. The pricing model is thus derived from use cases and resource usage-based charges. For example, the amount of resources consumed is used to determine the price of the service. However, the resource consumption model may not provide the best service for the customer or the most cost efficient use of resources for the vendor.

SUMMARY

In one embodiment, a method determines a task to execute in a computer processing system. A resource consumption template from a plurality of resource consumption templates is determined for the task. The plurality of resource consumption templates have different priorities. A computer processing system determines resources for the task based on the determined resource consumption template. Also, the computer processing system processes the task using the allocated resources. The processing of the task is prioritized based on the priority of the resource consumption template.

In one embodiment, the method includes logging allocated resources used in executing the task and using the logged allocated resources and the resource consumption template to determine billing for the task.

In one embodiment, the plurality of resource consumption templates are associated with different pricing models based on the different priorities.

In another embodiment, a computer-readable storage medium containing instructions for controlling a computer system to perform a method is provided. The method determines a task to execute using the computer system. A resource consumption template from a plurality of resource consumption templates is determined for the task. The plurality of resource consumption templates have different priorities. Resources for the task are determined based on the determined resource consumption template. Also, the task is processed using the allocated resources. The processing of the task is prioritized based on the priority of the resource consumption template.

In one embodiment, the task is included within a plurality of tasks including different resource consumption templates of different priorities. The method includes prioritizing the plurality of tasks according to the different resource consumption templates, wherein tasks in the plurality of tasks associated with resource consumption templates of a higher priority are given higher priority in processing than tasks associated with resource consumption templates of a lower priority.

In one embodiment, an apparatus includes one or more computer processors; and a computer-readable storage medium. The one or more processors are configured with instructions to perform a method. The method determines a task to execute. A resource consumption template from a plurality of resource consumption templates is determined for the task. The plurality of resource consumption templates have different priorities. Resources for the task are determined based on the determined resource consumption template. Also, the task is processed using the allocated resources. The processing of the task is prioritized based on the priority of the resource consumption template.

The following detailed description and accompanying drawings provide a better understanding of the nature and advantages of the present invention.

DETAILED DESCRIPTION

Described herein are techniques for a resource consumption template processing model. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
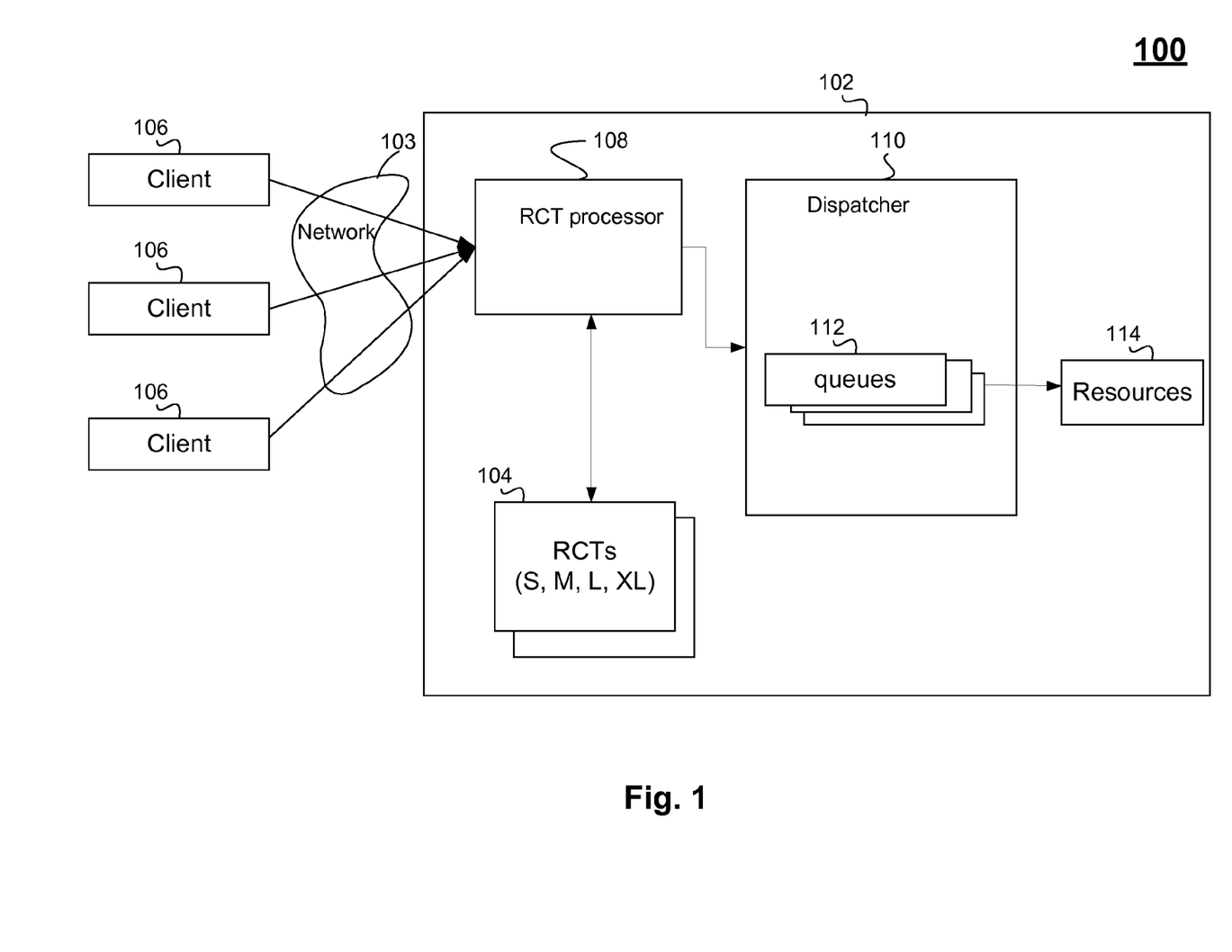
FIG. 1 depicts a simplified system for resource consumption template processing according to one embodiment.

FIG. 1 depicts a simplified system 100 for resource consumption template processing according to one embodiment. Particular embodiments use resource consumption templates (RCTs) 104 to provide services, such as software-as-a-service products. A vendor (e.g., a company) may offer a SaaS product to a customer. The SaaS product may be access and use of a software application. As described above, the application may be offered through a network 103, such as the Internet. In this case, clients 106 access the application from an application server 102 through network 103.

Application server 102 is adapted to execute tasks with the required resources and different priority that is assigned by different resource consumption templates 104. A task may be an operation that is performed using an application. In one embodiment, a task is an action, e.g., for any kind of request, such as batch job, updating task, remote function call (RFC), hypertext transcript protocol (HTTP), and simple mail transcript protocol (SMTP) requests for processing, and each task may contain several sub-tasks, which are executed again as a task. For example, during execution of an http request, an HTTP task may lead to execution of sub-tasks, such as parallel processing tasks or update or batch tasks. Application server 102 may check the required resources and priority for the tasks at runtime and prioritize tasks based on an associated resource consumption template for each task. Thus, application server 102 processes the tasks with different priorities according to an underlying resource consumption template 104.

Resource consumption templates 104 may be associated with different pricing models. For example, RCTs 104 are shown with different types of priority that are designated as S, M, X, XL, etc. This notation may stand for small, medium, large, and extra large, where small indicates a lowest pricing model and extra large indicates the highest pricing model. Other template types may also be provided. It is expected that the small RCT has a lower priority than the medium RCT, and so on. Tasks are associated with different RCTs and are executed according to the priority associated with the RCT.

In addition to being assigned a priority, resource consumption templates 104 include information that is used to determine resources for the task. For example, the resources that can be allocated to process the task are defined in resource consumption templates 104. Also, RCTs 104 may include limits on what resources can be consumed to process a task. For example, if a user desires order processing, a certain amount of resources can be used to process an order. If the amount of resources needed exceeds the limits, RCT 104 may define what response should be taken, such as generating an error message, generating a message for the user indicating the limits were exceeded (and requesting an upgrade), or interrupting processing. Other actions may also be performed such as billing the user for the extra resources used.

Clients 106 may send requests to application server 102. Clients 106 may be any computing devices and may be operating on a software-as-a-service model. As different clients 106 send requests to application server 102, an RCT processor 108 associates an RCT 104 with a task used to process the request.

RCT processor 108 may use different methods to determine an RCT 104 for a task. The RCT tag identifies which RCT 104 the task should be processed with using application server 102. In one example, user accounts may be categorized where each user account is assigned a resource consumption template 104. RCT tags may be used to identify an RCT 104. For example, each user account may be associated with an RCT tag. The RCT tag may identify which of the S, M, X, and XL RCTs 104 are associated with the user account. In other examples, Internet domains, such as <company>.hosting.com, may be used to assign RCT tags to tasks. For example, each company may be assigned an RCT tag. Other methods may also be used to assign RCT tags, such as cookies received with the task may include the RCT tag or include information that is used to determine the RCT tag. Thus, RCT processor 108 receives the task and assigns an RCT tag to the task or the task may be received and already be associated with an RCT tag.

At runtime, application server 102 may perform checks that are performed to determine which resources are needed for the task. The checks include allocating memory, executing parallel processing, planning batch jobs or updating tasks, and initiating hypertext transcript protocol (HTTP) and simple mail transcript protocol (SMTP) requests. Other checks may also be performed. These checks will be described in more detail below. Different entities in application server 102 may perform the checks as will be described below.

RCT processor 108 passes the task to a dispatcher 110. Dispatcher 110 prioritizes the task based on the RCT tag associated with each task. The execution of the task is based on the priority of the RCT tag. In one embodiment, as will be described in more detail below, queues 112 may be used to process the tasks according to different priorities. For example, different queues 112 may be provided for each priority level for the RCT tags. Also, there may be multiple queues 112 for different kinds of tasks (e.g., update tasks, batch tasks) as will be described in more detail below.

Dispatcher 110 then dispatches the tasks, which may be executed using resources 114. For example, resources may be allocated at runtime and are executed based on the priority assigned to each task. For example, dispatcher 110 dispatches tasks from queues 112 based on an associated priority.

In one embodiment, application server 102 may dynamically execute different tasks with different RCT tags (e.g., priorities) using shared resources 114. Shared resources 114 are resources of application server 102 that may be available for execution of tasks for different clients 106 and RCT 104. Resources may be shared on application server 102 among different tasks because RCTs 104 are used to apply priority to tasks.

The sharing of available resources 114 may optimally use available resources and may dramatically reduce the total cost of operation of providing SaaS products. For example, instead of having dedicated servers for each different type of RCT 104, resources are shared and optimally used.

The logging of consumed resources during execution of tasks may also be provided. This may allow system 100 to determine the required resources and tailor resource consumption templates 104 for different application scenarios based on previous usage. Also, a pricing model based on the consumed resources in relation to the processing priority may also be offered. By recording the access to resources, the customer may pay for only consumed resources. Thus, the customer may pay for the priority that is offered by the resource consumption template in addition to the consumed resources. Any additional resources that are not included in the resource consumption template may also be paid for using an additional charge.

Figure 2:
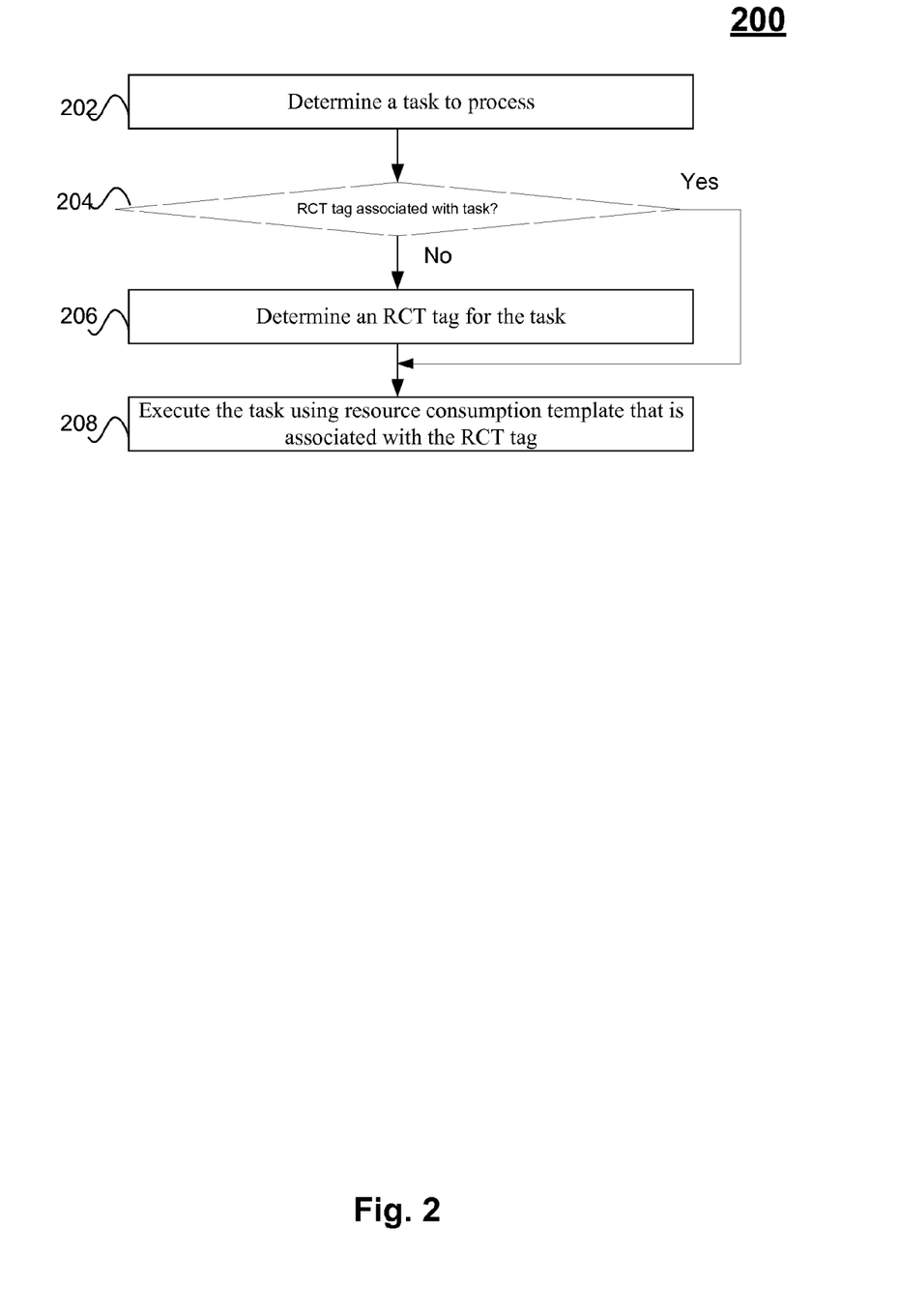
FIG. 2 depicts a simplified flowchart of a method for processing resource consumption templates according to one embodiment.

FIG. 2 depicts a simplified flowchart of a method for processing resource consumption templates 104 according to one embodiment. At 202, application server 102 determines a task to process. The task may be for a request that is received from client 106. For example, the next task may be received from a request at a uniform resource locator (URL), such as HTTP://<domain>/<servicepath>.

At 204, application server 102 determines if an RCT tag is associated with the task. For example, the RCT tag may be stored with the task. If an RCT tag is not associated with the task, at 206, application server 102 determines an RCT tag for the task. For example, different methods may be used to determine the appropriate resource consumption template 104 for the task. In one example, a user account associated with the task is determined and an RCT tag associated with the user account is determined Also, the domain <domain> or service path <servicepath> of the request may be used to determine the RCT tag for the task. Other information may also be included in the request, such as a cookie in the case of a web browser-based request, and may include the RCT tag.

Once the RCT tag has been determined, at 208, application server 102 executes the task using resource consumption template 104 that is associated with the RCT tag. For example, application server 102 may process the task based on the priority assigned to resource consumption template 104 using available resources.

Figure 3A:
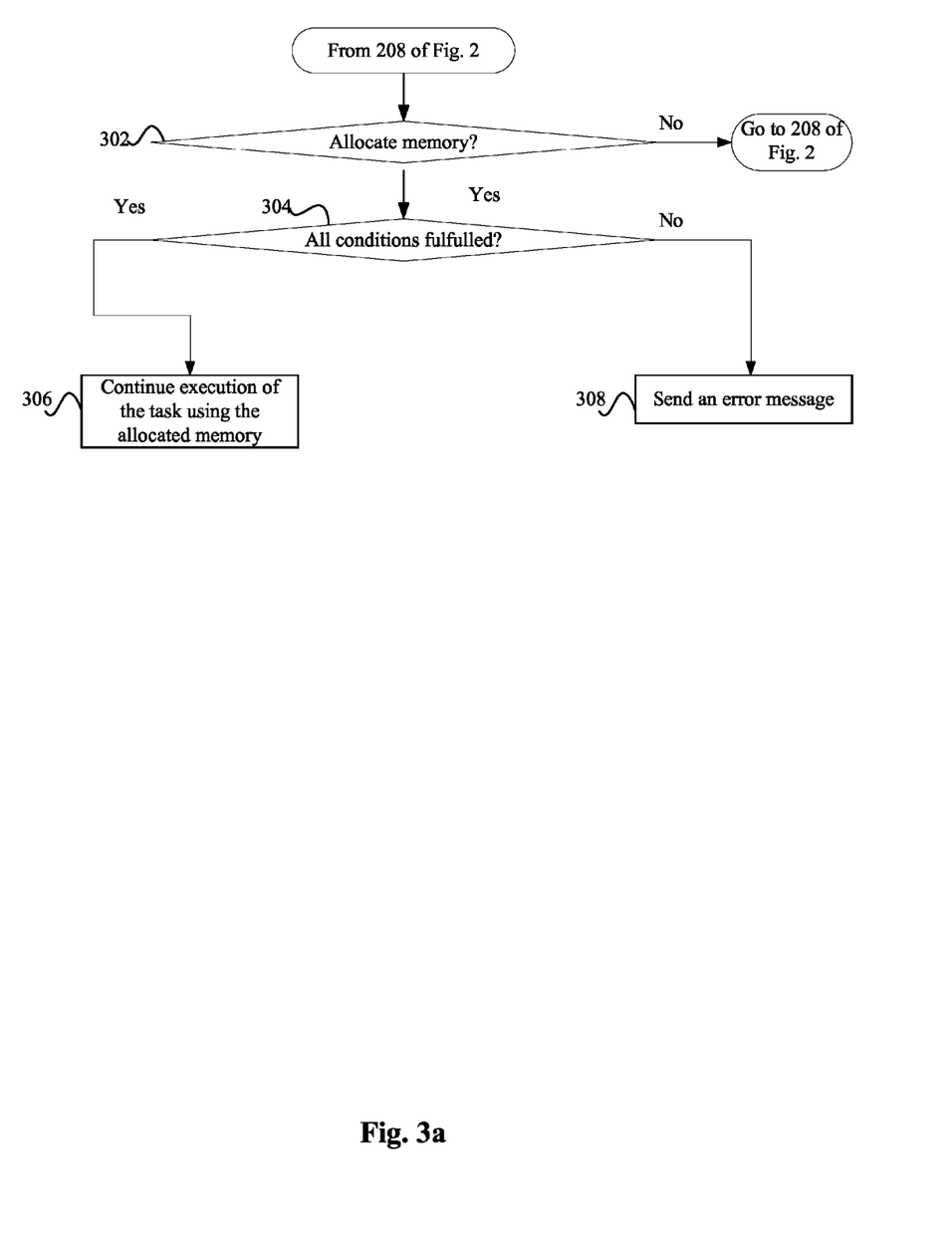
FIG. 3a depicts a simplified flowchart of a method for determining if memory should be allocated according to one embodiment.
Figure 3B:
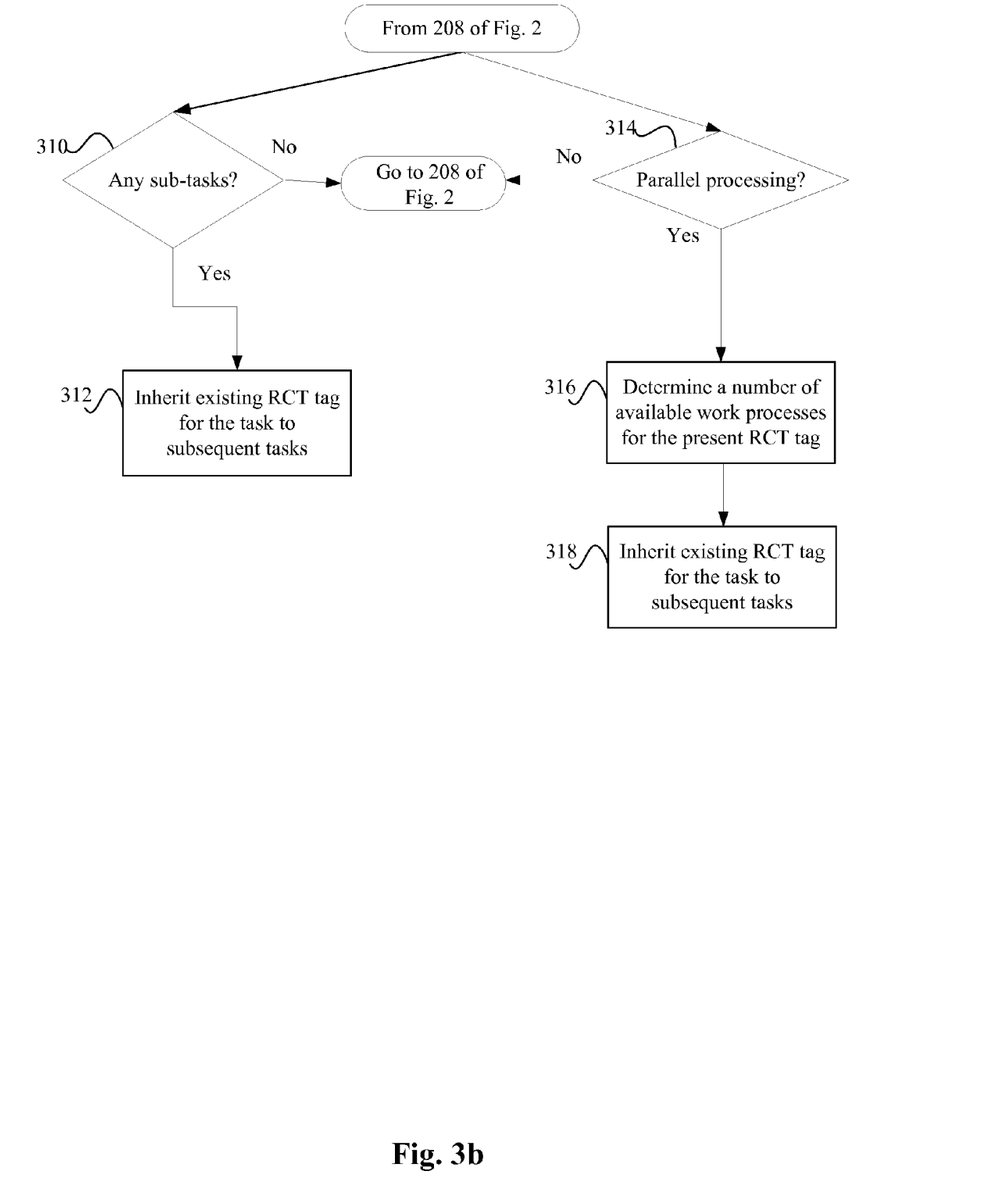
FIG. 3b depicts additional actions that may be performed during execution of the task according to one embodiment.

In executing the task, different actions may be performed and are described in FIGS. 3a and 3b. For example, certain checks are performed to determine resources that are needed to process the task. In one example, checks may include determining a number of parallel sessions created via the requests from HTTP/HTTPS web requests or RFC/CPIC requests. Also, the total allocated memory for a task may be checked. The number of allocated entries for a database (plus a deviation, if necessary) either as a total size or per table type may also be checked for a task. The number of communication channels to external servers may be checked. For example, a number of HTTP connections, number of SMTP/e-mail messages may be restricted per RCT type. Further checks may also be performed based on the allocation of memory for a task or the number of database entries. For example, the allocated memory for the establishment of a session for a task and a requirement for data types, such as advanced business application program (ABAP) data types, such as internal tables and database operations, may also be checked.

One of the checks is determining if memory is needed for the task. FIG. 3a depicts a simplified flowchart 300 of a method for determining if memory should be allocated according to one embodiment. At 302, application server 102 determines if memory should be allocated. For example, the memory that may be allocated includes in-memory storage, database storage, file storage, etc. For example, file storage may include memory for internal table handling. Also, memory for database create, read, update, and delete actions may also be allocated. If memory does not need to be allocated, the process returns to step 208 of FIG. 2 to continue executing.

If memory needs to be allocated, at 304, application server 102 determines if any conditions in resource consumption template 104 that is associated with the task are not fulfilled. For example, it is determined that the required memory for the task is greater than the memory limit in RCT 104.

At 306, if conditions are all fulfilled, then execution of the task is continued using the allocated memory. For example, a response to the source of the task may be sent, such as a response to HTTP://<domain>/<servicepath>.

At 308, if the conditions are not fulfilled, then an error message may be sent. For example, an error message may be sent to the user account requesting upgrade to a higher resource consumption template. Also, the event may be logged. For example, when the defined margins in an RCT type are exceeded, different actions may be performed. For example, the exceeding may be noted in a customer-related section of the RCT for the task. Also, the execution of the task may be interrupted and the customer is informed about the reason for the interruption. Alternatively, the execution of the task is not interrupted but additional required resources are logged and depending on the customer contract, subsequent actions may be taken, such as the customer may be charged for the additional services or the customer may receive a message with an offer to upgrade to a higher RCT template.

FIG. 3b depicts additional actions that may be performed during execution of the task according to one embodiment. At 310, application server 102 determines if sub-tasks should be performed. A sub-task may be a task that is processed for a main task. For example, the sub-task may be an update task or batch task that is planned. An update task may be a sub-task or another task that is used to execute a part of the task (e.g., updating the database) in parallel to the "main" task. The sub-task is initiated by main task and is executed either in parallel or at later time. A batch task may be where the task is performed with other tasks. The processing of update and batch tasks may be performed in the background or in parallel. Also, the sub-tasks may be tasks that are used to update the database.

If a sub-task does not need to be planned, then the process continues with execution at 208 in FIG. 2. If the sub-task should be planned, at 312, the existing RCT tag for the task is inherited to subsequent tasks. For example, the priority of the update task is derived from the original task's RCT tag. Also, for batch tasks, the RCT tag for the task in which the batch tasks are derived are also used. Although the same RCT tag is described as being used for update tasks and batch tasks, other RCT tags may also be determined For example, a lower priority RCT tag may be used for update or batch tasks.

At 314, application server 102 determines if any parallel processing of tasks should be applied. If not, the process continues at 208 of FIG. 2 in executing the task. Parallel processing of tasks may generate multiple tasks for the task that are processed in parallel.

Resources 114 may be categorized and defined as work processes to resource consumption templates 104. For example, the number of reserved work processes for the small RCT is lower than the number of reserved work processes for the medium RCT, and so on. The extra large RCT has the highest number of available work processes. Work processes may be processes that use resources to execute a task. Different percentages may be assigned, such as the small RCT has 10% of resources 114 assigned, 20% for the medium RCT, 30% for the large RCT, and 40% for the extra large RCT. The available resources are then assigned to tasks associated with different RCTs 104 according to the percentages. As will be described in more detail below, queues 112 may be used to perform the parallel processing of tasks.

At 316, if parallel processing should be applied, a number of available work processes for the present RCT tag is determined. For example, if the RCT tag is a large RCT tag, available work processes out of the 30% of assigned resources are determined At 318, the existing RCT tag is inherited to subsequent tasks that are generated. The process then proceeds to step 208 of FIG. 2 to have the tasks executed according to the work processes available for parallel processing as described above.

Particular embodiments may use queues 112 to process tasks using resource consumption templates 104. This may extend the functionality of application server 102 such that it can apply priority to RCTs 104. The use of queues 112 also allow application server 102 to share resources for different pricing models.

Figure 4:
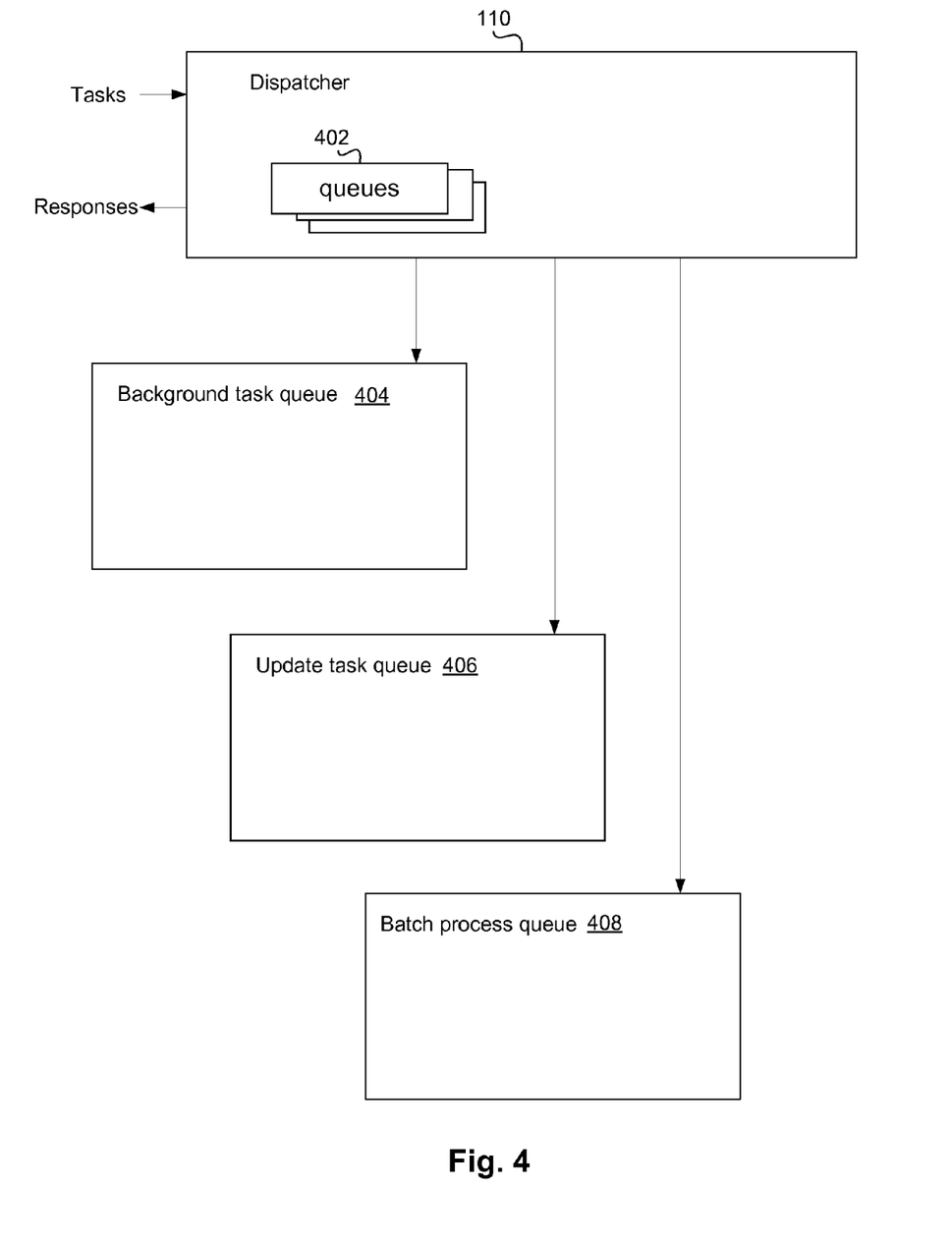
FIG. 4 depicts a more detailed example of dispatcher according to one embodiment.

FIG. 4 depicts a more detailed example of dispatcher 110 according to one embodiment. As shown, queues 112 may include queues 402, 404, 406, and 408. The tasks may be executed from any queues 402-408. Each queue 402-408 may include multiple queues. For example, queues for each RCT type—S, M, L, XL, may be provided. Additional queues may also be provided for other RCT types, such as unknown RCT types (i.e., tasks in which an RCT type cannot be determined).

Queues 402 may be used to queue tasks for different RCT tags. For example, tasks may be received and stored in queues 402 according to the priority associated with each RCT tag for each task. From queues 402, the tasks may be assigned to queues 404, 406, and 408 depending on the type of operation the task is to perform. Tasks may also be dispatched from queues 402.

Background task queue 404 may be a queue for processing tasks that are not update tasks or batch process tasks. For example, queue 404 is used to process background tasks, such as remote function call (RFC)-type transactional (T) and queued (Q) tasks. The background tasks may be tasks that are executed in the background and access the database.

Update task queue 406 may be a queue for update tasks that are sub-tasks. The update tasks are sent to queue 406. Batch process queue 408 are queues for batch process tasks. Other types of tasks may also be associated with their own queues and have priorities assigned to execution of the tasks.

Dispatcher 110 determines which tasks to dispatch for execution from queues 402-408 based on the priority of the RCT tag for the tasks. For example, different tasks are executed from different queues based on the priority associated with each queue. As discussed above, more resources may be allocated to a queue that is associated with a higher priority RCT type. Thus, more tasks may be executed from a higher priority queue than from a lower priority queue. This process is described in more detail in FIG. 5.

Figure 5:
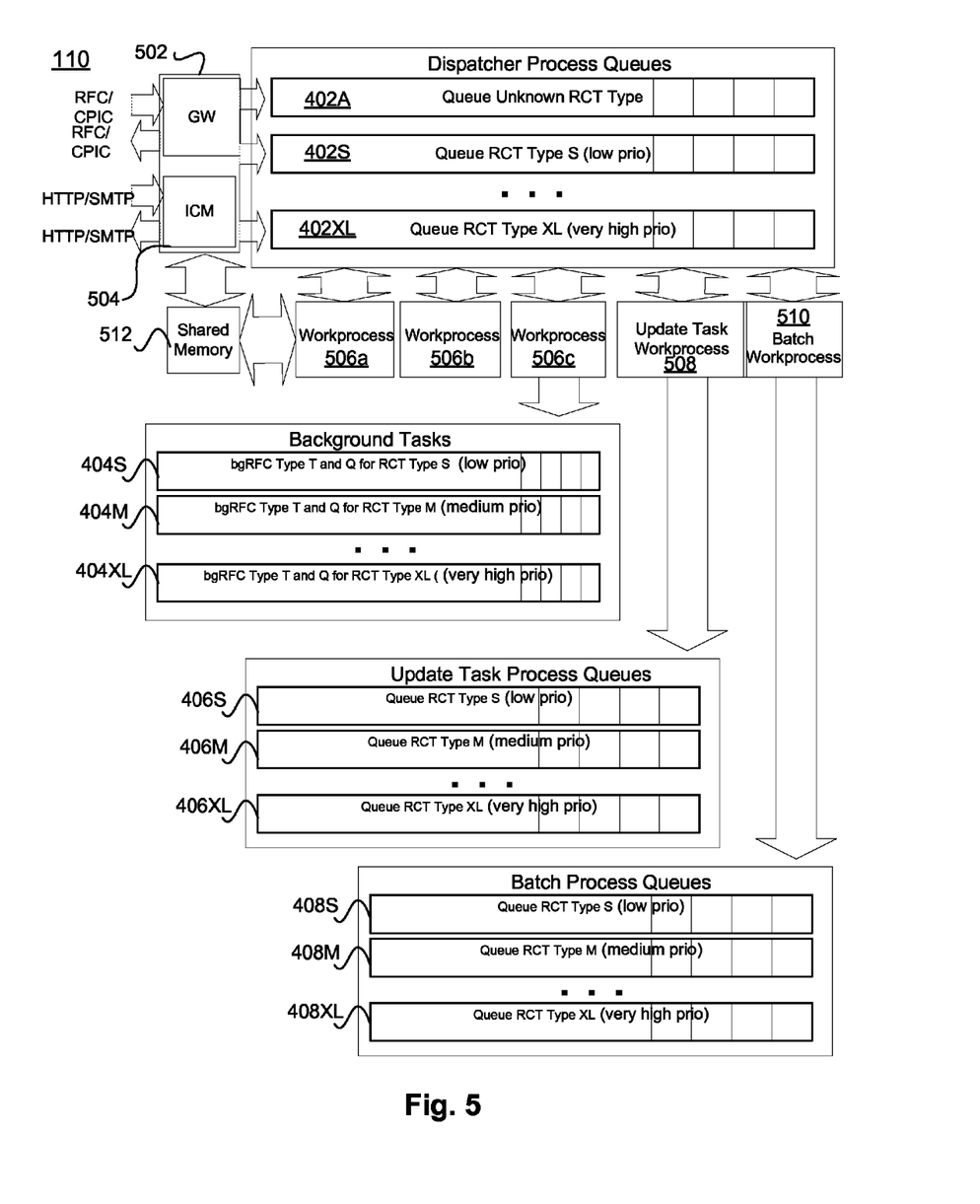
FIG. 5 depicts a more detailed example of dispatcher according to one embodiment.

FIG. 5 depicts a more detailed example of dispatcher 110 according to one embodiment. As shown, queues 402-408 include multiple queues for each RCT type (e.g., S, M, L, XL). For example, queues 402 include queues 402A, 402S, and 402XL. Queues for other RCT types are not shown for simplification purposes. Similar queues are shown for queues 404, 406 and 408. Thus, each RCT type may include its own queue within each different category of queues.

Dispatcher 110 receives tasks through a gateway 502 or an Internet communication manager (ICM) 504. Gateway 502 may communicate using remote function calls (RFC) or common processing interface for communications (CPIC) calls. ICM 504 may communicate using HTTP/SMTP. Requests may be communicated to dispatcher 110 and responses are also communicated by dispatcher 110 using gateway 502 and ICM 504.

Tasks for the requests are stored in queues 402 based on the RCT tag associated with each task. For example, tasks associated with the small RCT tag are stored in queue 402S, tasks associated with the extra large tag are stored in queue 402XL, and so on. Tasks may then be dispatched from queues 402. For example, work processes 506a and 506b may be assigned to execute tasks from queues 402. Shared memory 512 may be allocated to work processes 506, 508, and 510 to perform the tasks. Shared memory 512 may include data that is to be used to execute the task. The data may have been received with the request, such as through ICM 504. ICM 504 stores the data in shared memory 512 and the data is accessed by the work process when the task is executed.

Dispatcher 110 communicates with work processes 506 to execute tasks. Work processes 506 may execute tasks that do not fall under the types stored in queues 406 and 408. For queues 406 and 408, an update task work process 508 may execute tasks from update task process queues 406. Also, a batch work process 510 may execute tasks from batch process queues 408. Also, work process 506c may execute tasks from queues 404. These tasks may be executed in the background.

Dispatcher 110 may dispatch tasks using queues 402, 404, 406, and 408. For example, the tasks may be dispatched according to the priority associated with each queue. Depending on the amount of resources allocated to each RCT type, the tasks are executed with different priority from queues 402, 404, 406, and 408. Accordingly, the priority may be determined for a task at runtime and enforced during execution of the task. The priority is determined based on a RCT 104 that is used to determine resources needed to execute the task.

Particular embodiments provide many advantages. For example, application server 102 can better share its resources depending on the different priority requirements expressed as RCT types. Available resources can be dispensed more effectively on the basis of RCTs 104 that are associated with tasks. The excess resources may be part of the pricing model but the execution of tasks also take into account the pricing model, such as the capabilities of application server 102, such as response time, through-put, and high availability modes.

Dedicated error handling and actions may be applied depending on the RCT type. For example, a shortage of memory or high load (e.g. degradation of performance) may be offloaded to tasks with lower priority and may only be a temporary issue due to the sharing of resources. Also, during execution, additional required resources may be identified quicker or more appropriately using the RCT types. The actions can then be applied more appropriately, such as charging for additional resources not included in a customer's contract.

Accordingly, a processing of SaaS products may also be handled in a distributive environment by different application servers 102. For example, different resources and queues may be used in multiple application servers 102. For example, different resources may be consumed based on different RCT types using server farms (e.g., a cloud computing network).

Figure 6:
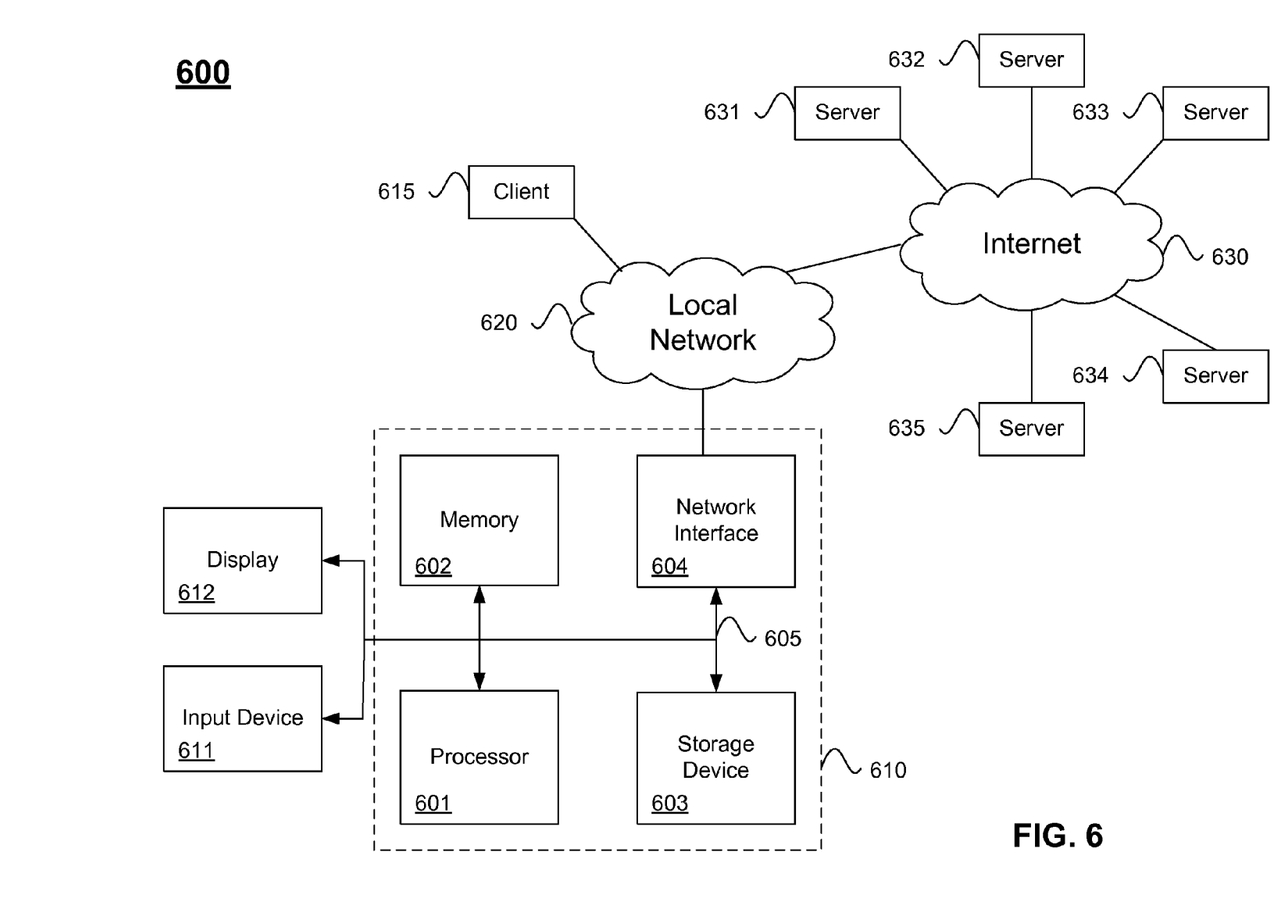
FIG. 6 illustrates hardware of a special purpose computing machine configured with resource consumption template processing according to one embodiment.

FIG. 6 illustrates hardware of a special purpose computing machine configured with resource consumption template processing according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes in application server 102 described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
assigning different priorities to a plurality of resource consumption templates, the plurality of resource consumption templates including resource information defining resources to use when using the plurality of resource consumption templates and what response should be taken, and also including limits on what resources are consumed to process a task;
determining the task to process in a computer processing system;
determining, for the task, a resource consumption template from a plurality of resource consumption templates, the resource consumption template assigned a priority and including resource information defining resources to use;
determining, by the computer processing system, resources for the task based on the resource information defining resources to use included in the determined resource consumption template;
tagging the task with a resource consumption template tag representing the priority associated with the resource consumption template, wherein different resource consumption tasks are associated with different resource consumption template tags;
prioritizing the task based on the resource consumption template tag;
sending the task to a queue based on the resource consumption template tag of the resource consumption template, wherein the queue comprises a plurality of queues for the plurality of resource consumption templates; and
processing, by the computer processing system, the task from the queue using the determined resources.

2. The method of claim 1, wherein determining the resource consumption template comprises determining a user account associated with the task, wherein the user account is associated with the resource consumption template.

3. The method of claim 1, wherein determining the resource consumption template comprises determining a domain name, a path name, or a cookie associated with a request for the task, wherein the domain name, the path name, or the cookie is associated with the resource consumption template.

4. The method of claim 1, further comprising:
logging the determined resources used in executing the task; and
using the logged determined resources and the resource consumption template to determine billing for the task.

5. The method of claim 1, wherein the task is stored in one of the plurality of queues associated with the resource consumption template tag of the queue.

6. The method of claim 1, wherein the task is included within a plurality of tasks including different resource consumption template tags of different priorities, the method further comprising:
prioritizing the plurality of tasks according to the different resource consumption template tags, wherein tasks in the plurality of tasks associated with resource consumption template tags of a higher priority are given higher priority in processing than tasks associated with resource consumption template tags of a lower priority.

7. The method of claim 1, wherein the task comprises a first task, the method further comprising inheriting the resource consumption template tag to a second task for the first task, wherein the second task is a subsequent task related to the first task.

8. The method of claim 1, wherein processing comprises performing sub-tasks for processing of the task, wherein the sub-tasks inherit the resource consumption template tag of the task.

9. The method of claim 1, wherein the plurality of resource consumption templates are associated with different pricing models based on the different priorities.

10. The method of claim 1, wherein processing comprising:
determining a plurality of tasks to process in parallel for the task; and
inheriting the resource consumption template tag for the plurality of tasks.

11. The method of claim 1, wherein processing comprises: checking which resources should be determined for the task at run-time; and assigning the priority to the task at run-time.

12. A non-transitory computer-readable storage medium containing instructions for controlling a computer system to perform a method, the method comprising:

assigning different priorities to a plurality of resource consumption templates, the plurality of resource consumption templates including resource information defining resources to use when using the plurality of resource consumption templates and what response should be taken, and also including limits on what resources are consumed to process a task;

determining the task to process in a computer processing system;

determining, for the task, a resource consumption template from a plurality of resource consumption templates, the resource consumption template assigned a priority and including resource information defining resources to use;

determining, by the computer processing system, resources for the task based on the resource information defining resources to use included in the determined resource consumption template;

tagging the task with a resource consumption template tag representing the priority associated with the resource consumption template, wherein different resource consumption tasks are associated with different resource consumption template tags;

prioritizing the task based on the resource consumption template tag;

sending the task to a queue based on the resource consumption template tag of the resource consumption template, wherein the queue comprises a plurality of queues for the plurality of resource consumption templates; and processing, by the computer processing system, the task from the queue using the determined resources.

13. The non-transitory computer-readable storage medium of claim 12, further comprising:

logging the determined resources used in executing the task; and using the logged determined resources and the resource consumption template to determine billing for the task.

14. The non-transitory computer-readable storage medium of claim 12, wherein the task is included within a plurality of tasks including different resource consumption template tags of different priorities, the method further comprising:

prioritizing the plurality of tasks according to the different resource consumption template tags, wherein tasks in the plurality of tasks associated with resource consumption template tags of a higher priority are given higher priority in processing than tasks associated with resource consumption template tags of a lower priority.

15. The non-transitory computer-readable storage medium of claim 12, wherein the plurality of resource consumption templates are associated with different pricing models based on the different priorities.

16. The non-transitory computer-readable storage medium of claim 12, wherein the task comprises a first task, the method further comprising inheriting the resource consumption template to a second task for the first task, wherein the second task is a subsequent task related to the first task.

17. The non-transitory computer-readable storage medium of claim 12, wherein processing comprises:

checking which resources should be determined for the task at run-time; and assigning the priority is assigned to the task at run-time.

18. An apparatus comprising:

one or more computer processors; and a computer-readable storage medium, wherein the one or more processors are configured with instructions to perform a method, the method comprising:

assigning different priorities to a plurality of resource consumption templates, the plurality of resource consumption templates including resource information defining resources to use when using the plurality of resource consumption templates and what response should be taken, and also including limits on what resources are consumed to process a task;

determining the task to process in a computer processing system;

determining, for the task, a resource consumption template from a plurality of resource consumption templates, the resource consumption template assigned a priority and including resource information defining resources to use;

determining, by the computer processing system, resources for the task based on the resource information defining resources to use included in the determined resource consumption template;

tagging the task with a resource consumption template tag representing the priority associated with the resource consumption template, wherein different resource consumption tasks are associated with different resource consumption template tags;

prioritizing the task based on the resource consumption template tag;

sending the task to a queue based on the resource consumption template tag of the resource consumption template, wherein the queue comprises a plurality of queues for the plurality of resource consumption templates; and processing, by the computer processing system, the task from the queue using the determined resources.

\* \* \* \* \*